(12) United States Patent
Benwadih

(10) Patent No.: US 10,788,371 B2
(45) Date of Patent: Sep. 29, 2020

(54) PYROELECTRIC SENSOR WITH AN ELECTROMAGNETIC SHIELDING INCLUDING A COMPOSITE MATERIAL

(71) Applicant: COMMISSARIAT A L'ENERGIE ATOMIQUE ET AUX ENERGIES ALTERNATIVES, Paris (FR)

(72) Inventor: Mohammed Benwadih, Champigny sur Marne (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 12 days.

(21) Appl. No.: 16/229,648

(22) Filed: Dec. 21, 2018

(65) Prior Publication Data
US 2019/0195692 A1 Jun. 27, 2019

(30) Foreign Application Priority Data
Dec. 22, 2017 (FR) ...................... 17 62927

(51) Int. Cl.
*G01J 5/06* (2006.01)
*G01J 5/34* (2006.01)
*G06K 9/00* (2006.01)

(52) U.S. Cl.
CPC . *G01J 5/06* (2013.01); *G01J 5/34* (2013.01); *G06K 9/00053* (2013.01); *G01J 2005/065* (2013.01); *G01J 2005/345* (2013.01)

(58) Field of Classification Search
CPC .......... G01J 5/06; G01J 2005/065; G01J 5/34; G01J 2005/345; G06K 9/00053
See application file for complete search history.

(56) References Cited

U.S. PATENT DOCUMENTS

2011/0280276 A1 11/2011 Mainguet et al.
2017/0293791 A1* 10/2017 Mainguet ............. G06K 9/0002

FOREIGN PATENT DOCUMENTS

EP 0 798 546 A1 10/1997
EP 2 385 486 A1 11/2011
(Continued)

OTHER PUBLICATIONS

French Preliminary Search Report dated Aug. 10, 2018 in French Application 17 62927 filed on Dec. 22, 2017 (with English Translation of Categories of Cited Documents).
(Continued)

*Primary Examiner* — David P Porta
*Assistant Examiner* — Fani Boosalis
(74) *Attorney, Agent, or Firm* — Oblon, McClelland, Maier & Neustadt, L.L.P.

(57) ABSTRACT

The invention relates to a heat pattern sensor including a matrix of pyroelectric capacitances. The sensor further includes an electromagnetic shielding stage, electrically conducting, situated between a stage including a pyroelectric material and a contact surface of the sensor. The electromagnetic shielding stage includes a shielding layer which comprises nanowires and/or nanotubes lying in a surrounding medium. The nanowires and/or nanotubes have a thermal conductivity greater than that of the surrounding medium. A ratio between a distribution pitch of the pixels of the matrix of pixels and a thickness of the shielding layer is greater than or equal to 20. The invention makes it possible to obtain at the same time rapid heat transfers through the electromagnetic shielding stage and low lateral heat transfers, from one pixel to the other of the sensor.

15 Claims, 3 Drawing Sheets

(56) References Cited

FOREIGN PATENT DOCUMENTS

FR           3 054 698 A1    2/2018
WO    WO 2016/007089 A1    1/2016
WO    WO 2017/093179 A1    6/2017

OTHER PUBLICATIONS

White, S. et al. "Electrical Percolation Behavior in Silver Nanowire-Polystyrene Composites: Simulation and Experiment", Advanced Functional Materials, vol. 20, No. 16, 2010, 8 pages.
Fang, F. et al. "Layer-structured silver nanowire/polyaniline composite film as a high performance X-band EMI shielding material", Journal of Materials Chemistry C, vol. 4, No. 19, 2016, 11 pages.

\* cited by examiner

PYROELECTRIC SENSOR WITH AN ELECTROMAGNETIC SHIELDING INCLUDING A COMPOSITE MATERIAL

TECHNICAL FIELD

The invention relates to a heat pattern sensor of pyroelectric sensor type.

Such a sensor forms for example a papillary print sensor, notably a finger print sensor.

PRIOR ART

A pyroelectric sensor exploits the pyroelectric properties of a material, that is to say its capacity to generate electrical charges in response to a variation in temperature.

Such a sensor comprises a matrix of pyroelectric capacitances, each forming a transducer to translate a temporal variation in temperature into an electrical signal.

Each pyroelectric capacitance comprises a pyroelectric material portion, arranged between a lower electrode and an upper electrode. One of the electrodes is placed at a constant potential, and forms a reference electrode. The other electrode, designated charge collection electrode, collects the pyroelectric charges generated by the pyroelectric material in response to a variation in temperature. The charge collection electrode is connected to a reading circuit, for measuring the quantity of collected charges.

In operation, an object is pressed against a contact surface of the sensor.

The detection may simply exploit a temperature difference between this object and said contact surface. The sensor then carries out a passive type detection.

In the case of a finger print detection, the finger is pressed against the contact surface of the sensor.

At the level of the ridges of the print, the finger is in direct physical contact with the sensor. A thermal transfer between the skin and the contact surface of the sensor takes place by conduction, which leads to a first temporal variation in temperature.

At the level of the valleys of the print, the finger is not in direct physical contact with the sensor. A thermal transfer between the skin and the contact surface of the sensor takes place through air. Air has heat insulating properties, which leads to a second temporal variation in temperature, less important.

The difference between these two temporal variations in temperature is reflected by a difference between the signals measured by the pyroelectric capacitances, depending on whether they lie under a valley or under a ridge of the print. The image of the print then has a contrast that depends on this difference.

After several seconds, the temperature of the finger and the temperature of the contact surface are homogenised, and it is no longer possible to obtain a satisfactory contrast.

To overcome this drawback, heating means are added under the contact surface, in order to dissipate a certain quantity of heat in each pixel of the sensor. The variation in temperature measured in each pixel of the sensor then relates to the measure to which this quantity of heat is evacuated from the pixel. This makes it possible to improve, and to conserve over time, the contrast of an image acquired by means of said sensor. The sensor then carries out an active type detection. Such a sensor is described for example in the patent application EP 2 385 486.

In the case of finger print detection, the variation in temperature is important at the level of the valleys of the print, where heat is transferred to the finger only through air, and lower at the level of the ridges of the print, where heat is transferred efficiently to the finger, by conduction.

Whatever the type of detection implemented, a pyroelectric sensor advantageously comprises a so-called electromagnetic shielding stage, that is to say an electrically conducting stage, able to be connected to a constant potential source, and forming an electromagnetic shielding between an object to image applied against the contact surface of the sensor, and the pyroelectric material portions of the pixels of the sensor. The electromagnetic shielding stage offers protection with regard to electrostatic parasites, notably around 50 Hz, avoiding the recovery of electromagnetic noise in the measurements made. It also makes it possible to protect the sensor with regard to electrostatic discharges, brought by contact of the object to image against the contact surface of the sensor. In the case of a papillary print sensor, it offers protection with regard to electrostatic discharges, brought by contact with the skin when the finger touches the contact surface of the sensor.

The French patent application no 16 57391, filed on the 29 Jul. 2016, describes an example of a pyroelectric sensor able to carry out an active type detection, and comprising such an electromagnetic shielding stage. The electromagnetic shielding stage therein is constituted of a single layer made of electrically conducting material.

The electromagnetic shielding stage extends between the contact surface of the sensor, and the pyroelectric material portions of the pixels of the sensor, preferably under a protective layer of the sensor.

In order not to hinder heat exchanges between an object to image, pressed against said contact surface, and the pyroelectric material portions, the electromagnetic shielding stage must be able to transmit heat.

However, if this stage is constituted of a layer of a material having a too high thermal conductivity, there is a risk that heat propagates laterally in the electromagnetic shielding stage, from one pixel to the other of the sensor. This phenomenon, designated diathermy, or crosstalk, prevents a thermal pattern on the contact surface being reproduced faithfully at the level of the pyroelectric material portions.

Conversely, if this stage is constituted of a layer of a material having a too low thermal conductivity, exchanges of heat through this stage are slowed down, also slowing down the reading of the pixels of the sensor. This slower reading may pose difficulties, in particular for sensors of large dimensions.

One objective of the present invention is to propose a solution so that the electromagnetic shielding stage of a pyroelectric sensor offers a great speed of heat transfer, while limiting heat transfers from one pixel to the other of the sensor.

DESCRIPTION OF THE INVENTION

This objective is attained with a heat pattern sensor comprising a matrix of pixels, each pixel comprising at least one pyroelectric capacitance, formed by a pyroelectric material portion arranged between a so-called charge collection electrode and a so-called reference electrode, and the matrix of pixels comprising, superimposed above a substrate:

a stage of charge collection electrodes, comprising the charge collection electrodes of each of the pixels; and a stage including a pyroelectric material, comprising the pyroelectric material portions of each of the pixels.

The matrix of pixels further comprises a so-called electromagnetic shielding stage, electrically conducting, situated between the stage including a pyroelectric material and a contact surface for applying thereto an object to image.

According to the invention, the electromagnetic shielding stage includes a shielding layer that comprises nanowires and/or nanotubes lying, or bathed, in a medium designated surrounding medium.

Said nanowires and/or nanotubes are each constituted of a material having a thermal conductivity greater than that of said surrounding medium.

Moreover, a ratio between a distribution pitch of the pixels of the matrix of pixels and a thickness of the shielding layer is greater than or equal to 20.

The material of the nanowires and/or nanotubes forms a good thermal conductor, in comparison with said surrounding medium. Preferably, this material has a higher thermal conductivity by a factor of at least 10, and even at least 20, than the thermal conductivity of said surrounding medium.

The material of the nanowires and/or nanotubes is for example metal or carbon.

In practice, the material of the nanowires and/or nanotubes is moreover an electrically conducting material.

The nanowires and/or nanotubes thus offer rapid thermal transfers through the shielding layer, heat propagating rapidly in the shielding layer while passing through said nanowires and/or nanotubes.

Moreover, the nanowires and/or nanotubes each have in common a lengthened structure of reduced diameter. This structure makes it possible to limit heat transfers from one pixel to the other of the matrix of pixels, when the heat traverses the shielding layer while passing through the nanowires and/or nanotubes.

Moreover, the thickness of the shielding layer, defined along an axis orthogonal to an upper or lower face of the substrate, is much less than a distribution pitch of the pixels of the matrix of pixels.

This thickness is for example less than or equal to 1.5 µm, preferably less than or equal to 1.0 µm. This thickness is equal for example to 600 nm.

The pixel pitch is for its part greater than or equal to 20 µm, and preferably greater than or equal to 50 µm.

Thus, a ratio between the pixel pitch and the thickness of the shielding layer is advantageously greater than or equal to 20, and even greater than or equal to 50.

Consequently, a nanowire or nanotube, even if it is only slightly sloping relative to the plane of the substrate, traverses the shielding layer over a large part of its thickness, without however extending onto very numerous pixels of the matrix of pixels. The high ratio between the pixel pitch and the thickness of the shielding layer thus makes it possible to limit heat transfers from one pixel to the other of the matrix of pixels, while offering good heat transfers in the shielding layer, in the sense of its thickness.

The layer made of shielding material, and thus the electromagnetic shielding stage according to the invention, thus offer at one and the same time:
- rapid thermal transfers, along an axis (Oz) orthogonal to the plane of the substrate; and
- low lateral diffusion of heat, from one pixel to the other of the sensor.

It may be remarked that when a nanowire or nanotube slightly oversteps onto a neighbouring pixel, this does not induce an important detection error since the majority of the heat extends nevertheless into the correct pixel. For example, if a nanowire or nanotube extends for 80% of its length onto an initial pixel P1, and for 20% of its length onto a neighbouring pixel P2, the detection error will only be 20%.

It may also be remarked that as a function of the characteristic dimensions of the thermal pattern to image, relative to the pixel size, it is possible to tolerate more or less important oversteps onto neighbouring pixels. Put another way, if the characteristic dimensions of the thermal pattern to image are of the order of several pixels, a nanowire or nanotube may overstep onto neighbouring pixels without this resulting in a critical detection error. In particular, the level of overstep onto a neighbouring pixel is to be divided by the characteristic dimension of the thermal pattern, in pixels, to obtain the detection error rate. Thus, it is not obligatory that the nanowires or nanotubes each have a length less than or equal to the width of a pixel.

In practice, the width of a valley or a ridge of a finger print corresponds to around 10 pixels of the sensor. Thus, if a nanowire or nanotube extends for 80% of its length onto an initial pixel P1, and for 20% of its length onto a neighbouring pixel P2, the detection error will only be 2% (20%/10).

If need be, the electromagnetic shielding stage according to the invention may further form the reference electrodes of the pixels of the matrix of pixels. In an alternative, the reference electrodes extend into a stage of the sensor distinct from the electromagnetic shielding stage.

The composite material advantageously comprises between 30% and 40% by weight of binder, when the binder is electrically insulating. The composite material advantageously comprises between 45% and 55% by weight of binder, when the binder is electrically conducting.

The electromagnetic shielding stage may further include pads comprising graphene or metal. Preferably, the height of the pads is greater than or equal to half the thickness of the shielding layer.

The invention also relates to a method for manufacturing the matrix of pixels of a heat pattern sensor according to the invention, in which a step of producing the electromagnetic shielding stage comprises deposition of an ink including, in suspension in a solvent, said nanowires and/or nanotubes.

BRIEF DESCRIPTION OF THE DRAWINGS

The present invention will be better understood on reading the description of exemplary embodiments given for purely indicative purposes and in no way limiting, and by referring to the appended drawings in which.

DETAILED DESCRIPTION OF PARTICULAR EMBODIMENTS

For greater clarity, the axes (Ox), (Oy) and/or (Oz) of an orthonormal coordinate system have been represented in the figures. Scales are not respected in the figures, in particular the thicknesses of each of the layers and/or stages.

Figure 1A:
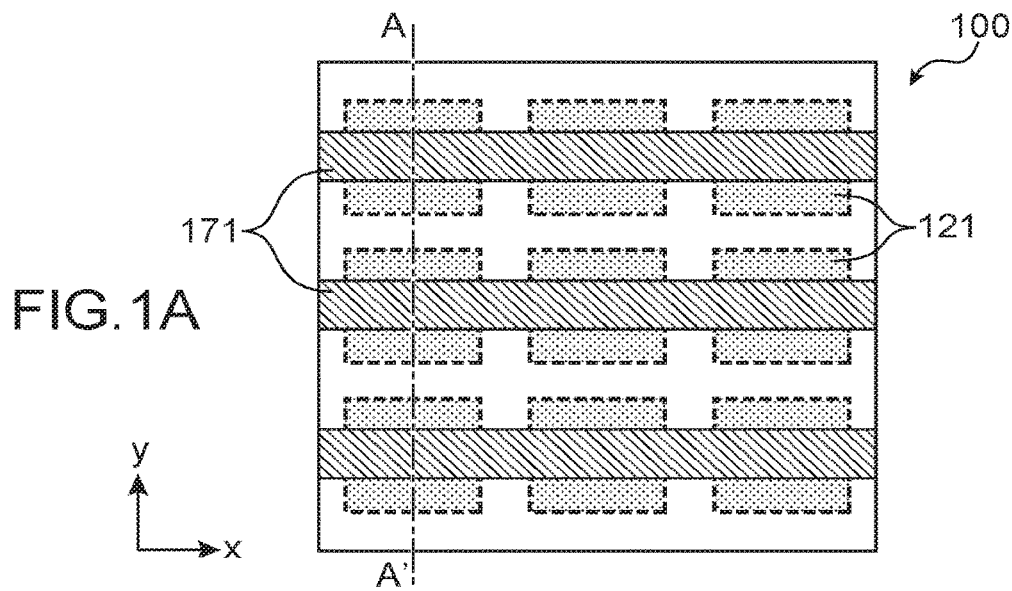
FIGS. 1A and 1B schematically illustrate a first embodiment of a heat pattern sensor according to the invention.
Figure 1B:
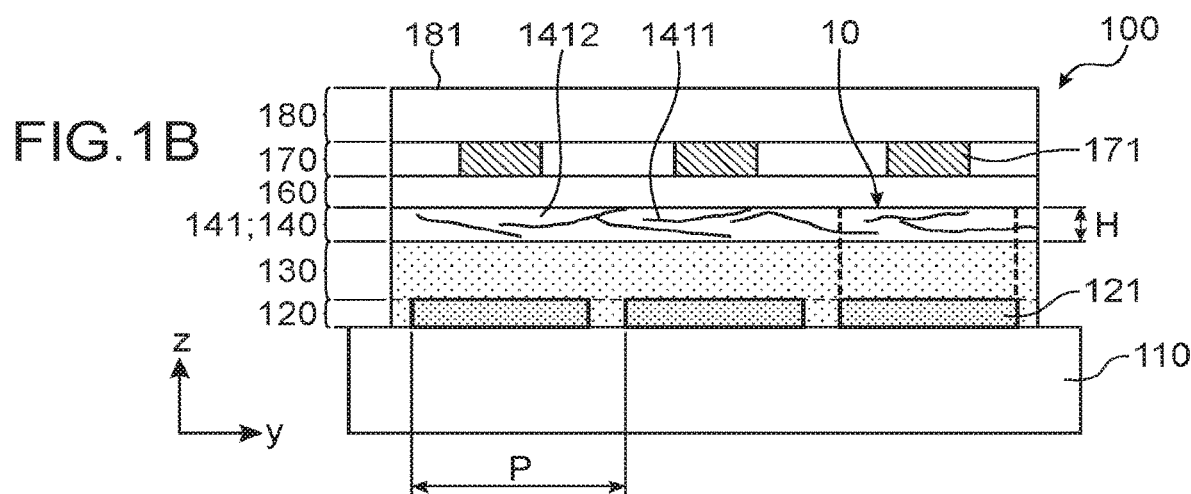

FIGS. 1A and 1B schematically illustrate a first embodiment of a heat pattern sensor 100 according to the invention. FIG. 1A is a schematic top view, in a plane parallel to the plane (xOy). FIG. 1B is a sectional view in a plane AA' parallel to the plane (yOz).

The heat pattern sensor 100 comprises, superimposed above a substrate 110, along the axis (Oz) orthogonal to an upper or lower face of said substrate:
- a stage 120 designated a charge collection electrode stage;
- a stage 130 including a pyroelectric material;
- an electromagnetic shielding stage 140;
- an electrical insulation layer 160;
- a heating stage 170; and
- a protective layer 180 (optional).

This stack forms a matrix of pixels, in which each pixel comprises at least one pyroelectric capacitance, formed by a pyroelectric material portion arranged between a charge collection electrode and a reference electrode. In this embodiment, the electromagnetic shielding stage 140 also forms a reference electrode common to all the pixels of the matrix of pixels.

The substrate 110 is for example made of glass, silicon, a plastic such as poly(ethylene terephthalate) (PET), poly(ethylene naphthalate) (PEN), polyimide (Kapton film), etc. It is preferably a flexible substrate, for example a substrate made of polyimide of 5 μm to 10 μm thickness, or a plastic such as PET.

It has an upper face and a lower face parallel with each other, and parallel to the plane (xOy). Hereafter, the plane of the substrate designates a plane parallel to these lower and upper faces.

The charge collection electrode stage 120 here comprises a matrix of charge collection electrodes 121, arranged in lines and in columns along the axes (Ox) and (Oy).

The charge collection electrodes are constituted of a metal such as gold or silver, or any other electrically conducting material.

They are distributed along the axes (Ox) and (Oy), according to a distribution pitch less than or equal to 150 μm. The distribution pitch is for example around 80 μm (i.e. a resolution of 320 dpi), or 90 μm. In an alternative, the distribution pitch may be 50.8 μm (i.e. a resolution of 500 dpi).

Each of the charge collection electrodes 121 here delimits, laterally, the pyroelectric capacitance 10 of one of the pixels of the matrix of pixels (see FIG. 1B).

The stage 130 including a pyroelectric material is here constituted of a full layer including poly(vinylidene fluoride) (PVDF) or one of the derivatives thereof (notably the copolymer PVDF-TrFE, TrFE for tri-fluoro-ethylene).

In an alternative, the layer 130 includes aluminium nitride (AlN), barium titanate ($BaTiO_3$), lead zirconate titanate (PZT), or any other pyroelectric material.

The layer 130 extends in one piece, and without opening, covering all of the charge collection electrodes 121 of the stage 120.

Each portion of the layer 130, situated facing a charge collection electrode 121, forms the pyroelectric material portion of a pixel of the matrix of pixels.

The electromagnetic shielding stage 140 forms an electrically conducting stage, comprising a shielding layer made of a composite material described hereafter.

It is able to be connected to a constant potential source, for example to the ground.

The stage 140 preferably extends in one piece, and without opening, above all of the charge collection electrodes 121 of the stage 120, that is to say passing through all the pixels of the matrix of pixels.

Here, the stage 140 also forms a reference electrode, common to all the pixels of the matrix of pixels. In other words, each portion of the stage 140, situated facing a charge collection electrode 121, forms the reference electrode of a pixel of the matrix of pixels.

The electrical insulation layer 160 is constituted of a dielectric material, for example polyimide. It preferably has a thickness less than 5 μm, for example equal to 1 μm.

According to the embodiment of FIGS. 1A and 1B, each pixel of the matrix of pixels further comprises a heating element, the heating elements here extending into the heating stage 170.

Here, the heating elements of a same line of pixels are electrically connected together to form a heating strip 171. The heating strips 171 are able to receive a heating current, to provide heating by Joule effect, so as to carry out an active type detection. They are preferably constituted of a metal, for example gold or silver.

The protective layer 180 forms the outermost layer of the sensor. It makes it possible to limit wear linked to repeated contacts with an object to image, notably with skin. The protective layer 180 is for example a layer made of DLC (Diamond Like Carbon), resin, polyimide, etc. It generally has a thickness comprised between several micrometres and 25 μm.

An upper face 181 of the protective layer 180, on the side opposite to the substrate 110, forms a contact surface of the thermal pattern sensor 100. In operation, an object to image such as a papillary print is applied against said contact surface 181, so as to produce thermal exchanges with the stage including a pyroelectric material.

According to the invention, the electromagnetic shielding stage 140 includes a shielding layer 141, made of composite material, covering all of the charge collection electrodes 121 of the stage 120.

A composite material is composed of at least two constituents, assembled together in a heterogeneous structure. These constituents remain distinct and separated in the composite material. They each have different physical or chemical properties. The composite material has for its part properties that each of the constituents, taken alone, does not have. It may be considered that it combines, or averages, the physical or chemical properties of its different constituents.

The composite material is here constituted by:
- lengthened electrically conducting structures, here metal nanowires 1411; and
- a binder 1412, also designated binder agent, or matrix, in which the metal nanowires 1411 are embedded.

Here, the electromagnetic shielding stage 140 is entirely constituted of said shielding layer 141.

The binder 1412 forms a surrounding medium, into which the metal nanowires 1411 extend.

The binder 1412 is generally constituted of a polymer material designated polymer matrix. It ensures the cohesion of the metal nanowires 1411, and their maintaining in position in the shielding layer, fixed relative to each other. It forms a surrounding medium.

The metal nanowires 1411 are physically isolated from each other by portions of the binder 1412, except, if need be, at the level of one or more contact point(s) between two neighbouring nanowires. The density of said contact points increases with the density of metal nanowires 1411 in the composite material.

The layout of the nanowires represented in the figures is purely for illustrative purposes and in no way limits the field of the invention.

According to the invention:
- the binder 1412 forms a poor heat conductor; and
- the metal nanowires 1411 are constituted of a material forming a good heat conductor.

Thus, heat circulates rapidly in the shielding layer, mainly by passing through the metal nanowires 1411.

Moreover, the metal nanowires 1411 are globally thermally insulated from each other by portions of the binder 1412. The thermal insulation between the metal nanowires 1411 decreases when the density of nanowires in the composite material increases.

The thickness H of the composite material shielding layer 141 is defined along the axis (Oz), orthogonal to the plane of the substrate.

The pixel pitch P is defined in a plane parallel to the plane of the substrate.

Preferably, the pixels of the matrix of pixels are distributed according to a square mesh matrix, having a same pitch P along the axes (Ox) and (Oy). If the pixels are distributed according to a meshing defined by several pitches, for example a rectangular mesh defined by a pitch along (Ox) and a pitch along (Oy), the smallest of these pitches is considered.

The pixel pitch P is at least 20 times greater than the thickness H, and even at least 50 times greater than the thickness H.

Preferably, the thickness H is less than 1 μm, for example equal to 0.6 μm or 0.5 μm.

The pixel pitch P corresponds to the distribution pitch of the charge collection electrodes, for example 50.8 μm or 80 μm, or preferentially 90 μm.

Heat circulates in the composite material shielding layer 141, mainly by passing through the metal nanowires 1411.

Thanks notably to the high ratio between the pixel pitch P, along (Ox), respectively (Oy), and the thickness H of the shielding layer 141, along (Oz), it is possible to obtain at one and the same time:
- rapid thermal transfers through the shielding layer 141, along the axis (Oz); and
- limited thermal transfers from one pixel to the other of the matrix of pixels, at the level of the shielding layer 141.

The metal nanowires 1411 are constituted of a material having a thermal conductivity greater than or equal to 100 $W \cdot m^{-1} K^{-1}$.

The metal nanowires 1411 include for example a metal such as silver, gold, copper, aluminium, etc. They are for example made of silver, with a thermal conductivity comprised between 400 and 429 $W \cdot m^{-1} K^{-1}$ (depending on the level of impurities of the silver metal).

The binder 1412 is preferably constituted of a material having a thermal conductivity less than or equal to 10 $W \cdot m^{-1} K^{-1}$.

In an even more preferred manner, it is constituted of a material having a thermal conductivity less than or equal to 1 $W \cdot m^{-1} K^{-1}$.

It is for example made of PEDOT:PSS (mixture of poly(3,4-ethylenedioxythiophene) (PEDOT) and sodium polystyrene sulfonate) (PSS)), having a thermal conductivity of 0.3 $W \cdot m^{-1} K^{-1}$.

Whatever the case, the thermal conductivity of the material forming the metal nanowires 1411 is preferably at least ten times greater than that of the binder 1412.

The shielding layer 141 forms an electrically conducting layer. In particular, it must be able to be voltage supplied, which does not require all the same the conduction of a current in all of said layer.

Several solutions make it possible to obtain this electrical conduction property.

A first solution consists in using an electrically insulating binder 1412, combined with a high density of metal nanowires 1411.

The nanowires 1412, since they are constituted of metal, are electrically conducting. In other words, they are constituted of a material having a low electrical resistivity, for example around $16 \cdot 10^{-9}$ Ω·m for silver, or $23 \cdot 10^{-9}$ Ω·m for gold.

Since the binder is electrically insulating, electrical conduction is ensured by the metal nanowires 1412, which then together form a so-called percolated network. In other words, it is possible to connect together pairs of two points belonging to two opposite edges of the shielding layer, by a continuous sequence of nanowires, each in direct physical contact with the next one.

The electrically insulating binder 1412 is for example a polymer matrix made of polyvinylpyrrolidone (PVP), or poly(methyl methacrylate) (PMMA), or polystyrene (PS), or CYTOP™ (amorphous fluorinated polymer).

This first solution gives access to a wide range of materials to form the binder, and to a wide range of inks to produce the composite material shielding layer (see hereafter).

According to a second solution, the binder 1412 is electrically conducting.

The binder may be made of PEDOT:PSS, or PEDOT, of electrical resistivity equal to $50000 \cdot 10^{-9}$ Ω·m.

PEDOT and PEDOT:PSS have the advantage that they may be deposited without necessity of a controlled atmosphere. Even so, other materials are not excluded, such as poly(p-phenylene sulfide), polypyrrole (PPY), polythiophene (PT), polyacetylene (PAC), polyaniline (PAni), melanin, organic dielectrics, etc.

The electrical resistivity of the material forming the binder 1412 may be much greater than that of a metal, for example greater than or equal to $10000 \cdot 10^{-9}$ Ω·m, since the composite material shielding layer is intended to withstand weak currents only.

In this second solution, the metal nanowires 1412 may form together a non-percolated network.

This second solution makes it possible to use a composite material having a low density of metal nanowires, which limits heat transfers from one pixel to the other of the matrix of pixels, through one or more nanowire(s).

The metal nanowires 1411 preferably each have a diameter comprised between 10 nm and 300 nm, more specifically between 10 nm and 100 nm. Such diameters avoid perturbing the layers deposited above the shielding layer, on the side opposite to the substrate.

Preferably, the metal nanowires 1411 each have a length strictly less than the pixel pitch of the matrix of pixels. This length is generally comprised between 5 μm and 100 μm, depending on the size of the pixel pitch.

Whatever the case, the density of metal nanowires 1411 is preferably comprised between 20% and 40% by weight of the composite material. Such a proportion makes it possible to limit the lateral diffusion of heat, through the metal nanowires.

With an electrically conducting binder 1412, the composite material 141 preferably comprises between 20% and 30% by weight of metal nanowires 1411.

With an electrically insulating binder 1412, the composite material 141 preferably comprises between 30% and 40% by weight of metal nanowires 1411, for example 35% by weight.

Preferably, the shielding layer 141, made of composite material, counts between 200 and 300 nanowires/mm$^2$, for example between 220 and 260 nanowires/mm$^2$.

In practice, two nanowires at the most extend into the shielding layer 141, in the sense of the thickness.

The first embodiment such as described above further has the advantage of not requiring a particular alignment of the electromagnetic shielding stage, relative to the pixels of the matrix of pixels.

Figure 1C:
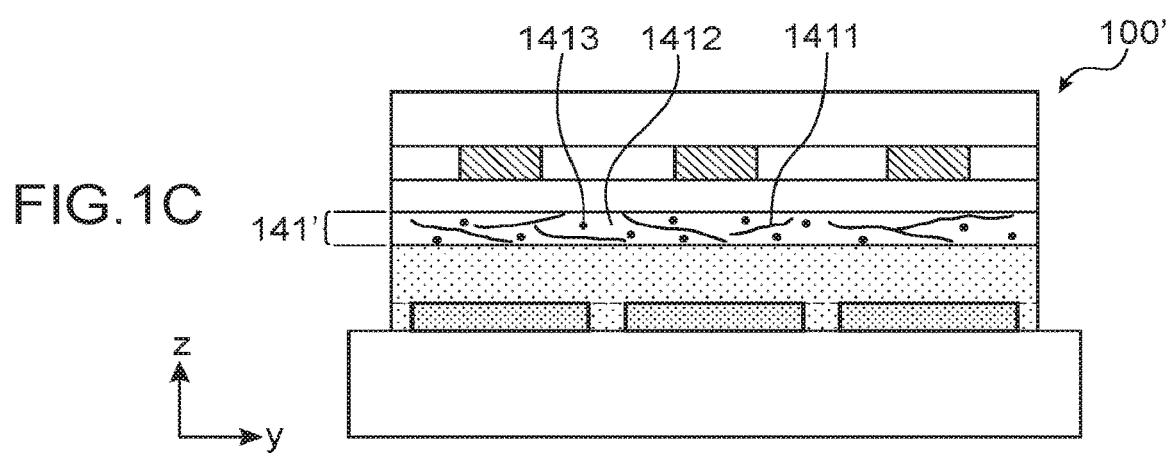
FIG. 1C illustrates an alternative of the embodiment of FIGS. 1A and 1B.

FIG. 1C illustrates, according to a sectional view in a plane parallel to the plane (yOz), an alternative 100' of the embodiment of FIGS. 1A and 1B.

This alternative only differs from that of FIGS. 1A and 1B in that the composite material of the shielding layer 141' further comprises graphene particles 1413, distributed with the metal nanowires 1411 in the binder 1412.

Graphene is a two-dimensional material of which the stack constitutes graphite, graphite being a crystalline form of carbon. Graphene is thermally and electrically conducting.

Graphene particles designate planar graphene clusters, here distributed in the shielding layer, and oriented along planes parallel to the plane of the substrate.

Graphene particles have a planar geometry. They have a section of width comprised between 1 µm and 10 µm, and a thickness comprised between several nanometres and 100 nm.

Preferably, the graphene particles are produced using a printable ink based on graphene, for example the ink Vor-ink™. The graphene particles, distributed in the composite material, make it possible to direct locally the temperature along the axis (Oz). The higher the section of the graphene particles, the more efficient the thermal transfer.

The graphene particles, of large section and of reduced thickness, are thus complementary to the metal nanowires, of small section and of large length.

The graphene particles further have the advantage of making a good interface with the layer 130 including a pyroelectric material.

They may further establish electrical and thermal contacts between neighbouring nanowires.

The composite material comprises for example between 10% and 30% by weight of graphene particles.

According to whether the binder 1412 is electrically conducting or not, and according to the density of metal nanowires, the preferred quantity of graphene particles varies.

With an electrically conducting binder 1412, the composite material comprises for example between 10% and 20% by weight of graphene particles. It comprises for example 35% by weight of metal nanowires, 50% by weight of binder, and 15% by weight of graphene particles, or even 25% by weight of metal nanowires, 50% by weight of binder, and 15% by weight of graphene particles.

With an electrically insulating binder 1412, the composite material comprises for example between 20% and 30% by weight of graphene particles. It comprises for example 35% by weight of metal nanowires, 40% by weight of binder, and 25% by weight of graphene particles, or even 25% by weight of metal nanowires, 40% by weight of binder, and 25% by weight of graphene particles.

Figure 2A:
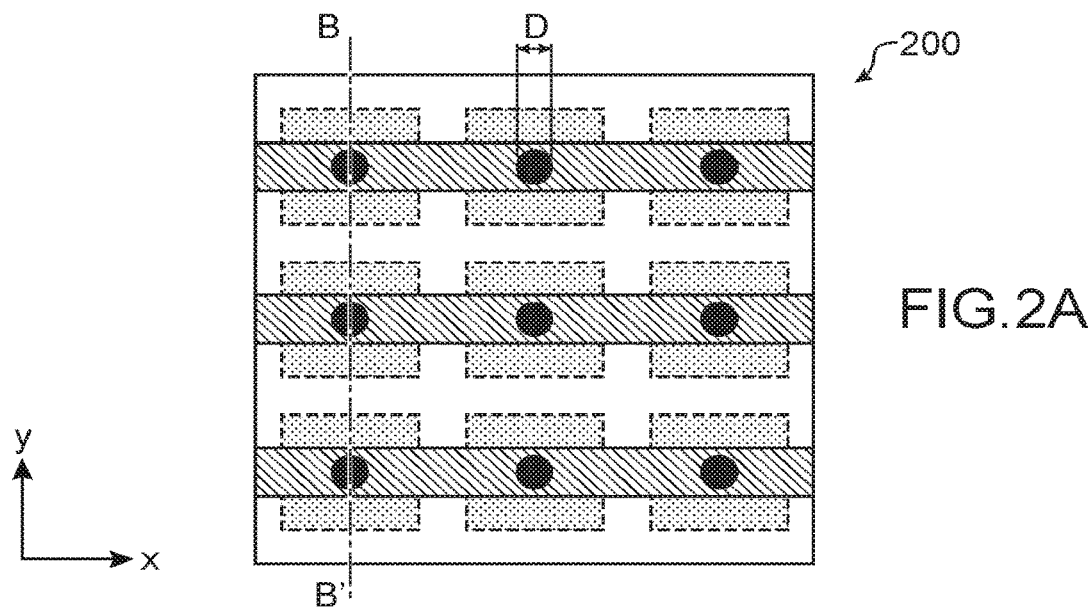
FIGS. 2A and 2B schematically illustrate a second embodiment of a heat pattern sensor according to the invention.
Figure 2B:
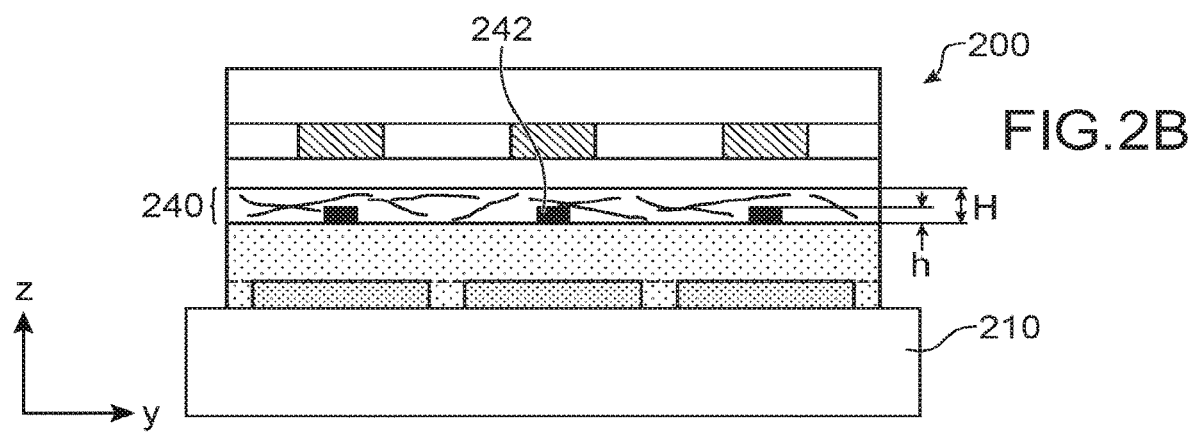

FIGS. 2A and 2B schematically illustrate a second embodiment of a heat pattern sensor 200 according to the invention. FIG. 2A is a schematic top view (transparent view), in a plane parallel to the plane (xOy). FIG. 2B is a sectional view in a plane BB' parallel to the plane (yOz).

This second embodiment only differs from the embodiment of FIGS. 1A and 1B in that the electromagnetic shielding stage 240 further comprises pads 242, each pad being here constituted of a thermally conducting material such as graphene or a metal.

The pads 242 extend entirely into the composite material shielding layer.

Preferably, they sink into the composite material shielding layer, from its lower face, situated on the side of the substrate 210. The composite material then extends between the pads, and above the pads on the side opposite to the substrate 210. It is then possible to identify, in the electromagnetic shielding stage 240:
  a lower sub-layer, situated on the side of the substrate 210, and receiving the pads 242 surrounded by composite material; and
  an upper sub-layer, situated above the lower sub-layer, and entirely constituted of the composite material.

Here, the electromagnetic shielding stage 240 is constituted of the composite material shielding layer and the pads 242.

Here, the pads 242 are regularly distributed, in lines and in columns, such that each pixel of the matrix of pixel comprises a single and unique pad 242. In other words, each pixel of the matrix of pixels comprises a portion of the electromagnetic shielding stage 240, and said portion receives a single pad 242.

Preferably, the geometric centre of a pad 242 and the geometric centre of the associated pixel together define an axis parallel to the axis (Oz).

The pads 242 have for example a cylinder of revolution shape, having:
  a diameter D (dimension in a plane parallel to the plane of the substrate 210); and
  a height h (dimension along the axis (Oz), orthogonal to the plane of the substrate 210).

Here, each pad 242 sinks in, along the axis (Oz) orthogonal to the plane of the substrate, over less than half of the thickness H of the composite material shielding layer.

The diameter D is less than the pixel pitch of the matrix of pixels, for example two times less than the pitch of the matrix of pixels. This diameter D is comprised for example between 10 µm and 100 µm, preferably between 50 µm and 60 µm. (The pads 242 are under-dimensioned in FIGS. 2A and 2B.)

Whatever the case, the pads 242 are physically isolated from each other, without direct physical contact between them.

The pads 242 cooperate with the metal nanowires of the composite material, in order to favour thermal transfers along the axis (Oz), in the electromagnetic shielding stage 240, and to limit transversal thermal transfers in said stage 240, in the planes (xOy).

Preferably, the pads are produced by means of a printable ink, for example an ink based on graphene, for graphene pads, or a metallic ink, for pads including a metal.

The aforementioned conditions, relative to the thickness H of the composite material shielding layer also apply in this second embodiment, in which pads are integrated in said shielding layer.

The invention is not limited to pads 242 of cylinder of revolution shape.

They may have a shape comprising a cylindrical central body framed vertically between a concave cap and concave foot. The diameter of a pad then corresponds to the diameter of its cylindrical central body.

According to other alternatives, not represented, the pads have non-circular sections in planes parallel to the plane of the substrate, for example square or rectangular sections, of side comprised for example between 10 µm and 40 µm.

If need be, it is possible to define the diameter of a pad as being the greatest length measured along a rectilinear axis, on this pad, in a plane parallel to the plane of the substrate.

The pads are distinguished from optional graphene particles of the composite material, notably by their dimensions: their diameter is greater than 10 µm.

Figure 2C:
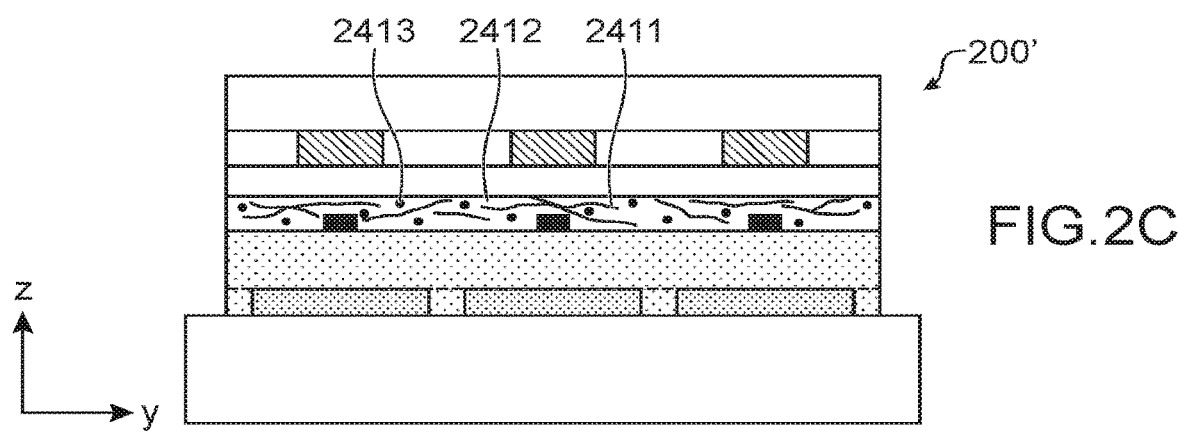
FIG. 2C illustrates an alternative of the embodiment of FIGS. 2A and 2B.

FIG. 2C illustrates, along a sectional view in a plane parallel to the plane (yOz), an alternative 200' of the embodiment of FIGS. 2A and 2B.

This alternative only differs from that of FIGS. 2A and 2B in that the composite material further comprises graphene particles 2413, distributed with the metal nanowires 2411 in the binder 2412.

Figure 3A:
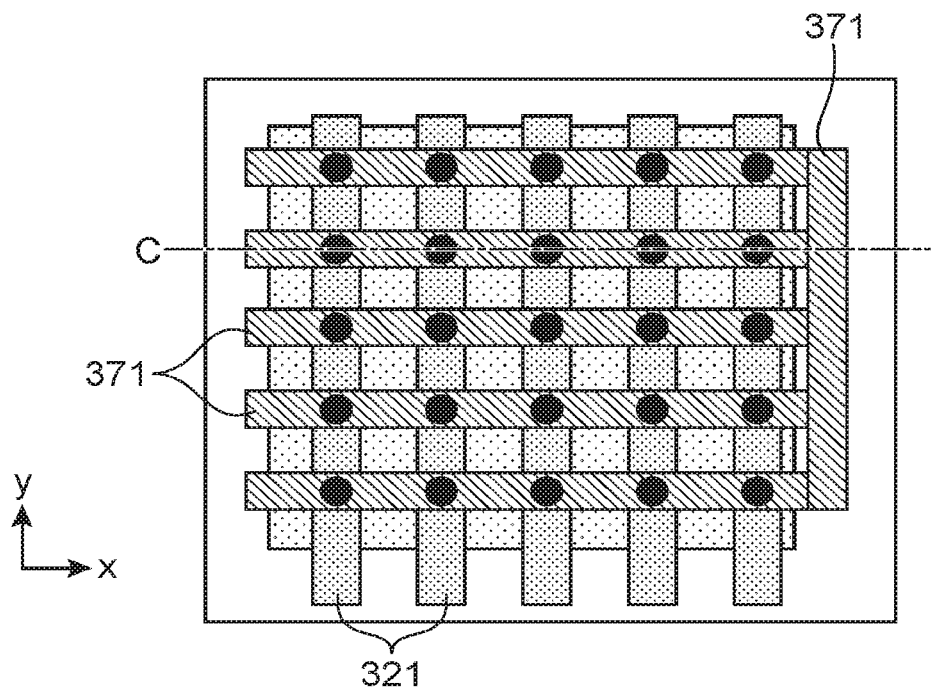
FIGS. 3A and 3B schematically illustrate a third embodiment of a heat pattern sensor according to the invention.
Figure 3B:
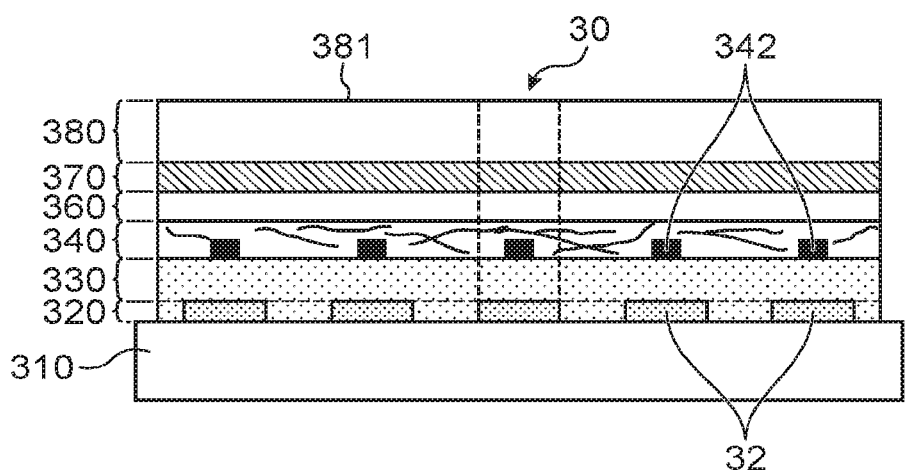

FIGS. 3A and 3B schematically illustrate a third embodiment of a heat pattern sensor 300 according to the invention. FIG. 3A is a schematic top view, in a plane parallel to the plane (xOy). FIG. 3B is a sectional view in a plane CC' parallel to the plane (xOz).

In this third embodiment, each pixel comprises a heating element, and these heating elements are exploited to carry out a passive addressing of the pixels of the sensor.

The heating elements of a same line of pixels are electrically connected together to form a heating strip 371. Each heating strip 371 is configured to be able to be activated independently of the other heating strips. In other words, the heating elements of the pixels of a same line of pixels are able to heat the pyroelectric material portions of the pixels of said line, independently of the heating elements of the pixels of the other lines. The heating strips 371 each have a first end, suitable for being connected to a non-zero electrical potential, and a second end, preferably connected to the ground. Here, the second ends of all the heating strips are connected together through a conducting portion 373.

Moreover, the charge collection electrodes of a same column of pixels are electrically connected together to form a charge collection macro-electrode 321. Each charge collection macro-electrode 321 is formed by an electrically conducting strip, in contact with the pyroelectric material portions of the pixels of said column of pixels, and distinct from the electrically conducting strips forming the charge collection macro-electrodes of the other columns of pixels.

Each charge collection macro-electrode 321 makes it possible to measure the sum of the pyroelectric charges, generated in a same column of pixels. If at each instant only a single one of the heating strips 371 is activated, in each column of pixels there is only a single pixel that generates pyroelectric charges. The pyroelectric charges collected by the charge collection macro-electrode 321 then relate to this single pixel. A passive addressing of the pixels of the sensor is thereby carried out. Such a sensor is described in the French patent application no 16 57391, mentioned in the introduction.

The terms "line" and "column" may be exchanged, which would correspond to a simple 90° rotation of the sensor.

In the embodiment of FIGS. 3A and 3B, the heat pattern sensor 300 comprises, superimposed in this order, above the substrate 310:
 a stage 320 of charge collection electrodes, receiving the charge collection macro-electrodes 321;
 a stage 330 including a pyroelectric material, identical to that described with reference to FIGS. 1A and 1B;
 an electromagnetic shielding stage 340, identical to that described with reference to FIGS. 2A and 2B;
 an electrical insulation layer 360, such as described with reference to FIGS. 1A and 1B;
 a so-called heating stage 370, receiving the heating strips 371; and
 a protective layer 380, such as described with reference to FIGS. 1A and 1B.

The contact surface 381 of the sensor is here formed by an upper face of the protective layer 380, on the side opposite to the substrate 310.

The stage 320 of charge collection electrodes is similar to that which has been described with reference to FIGS. 1A and 1B, except that the charge collection electrodes of a same column of pixels are formed together in one piece. They are distributed, along the axis (Ox), according to a distribution pitch less than or equal to 150 µm, for example 90 µm, or 80 µm, or 50.8 µm.

The heating strips 371 of the heating stage 370 are distributed, along the axis (Oy), preferably according to a distribution pitch identical to the distribution pitch of the charge collection macro-electrodes 321. Whatever the case, the heating strips of the stage 370 are preferably distributed according to a pitch less than or equal to 150 µm, for example 90 µm or 80 µm, or 50.8 µm. The heating strips 371 preferably include a metal, for example gold or silver.

Each pixel 30 of the matrix of pixel is delimited laterally by the intersection between a charge collection macro-electrode 321, and a heating strip 371. In other words, each pixel is delimited laterally, in planes parallel to the plane of the substrate, by the contours of the intersection between the orthogonal projection, in such a plane, of a charge collection macro-electrode 321, and the orthogonal projection, in this same plane, of a heating strip 371.

Each pixel 30 receives a single pad 342 of the electromagnetic shielding stage 340. This pad thus extends into the electromagnetic shielding stage 340, while traversing an intersection region situated in a plane parallel to the plane of the substrate, at the intersection between an orthogonal projection of a macro-electrode 321 and an orthogonal projection of a heating strip 371.

Figure 3C:
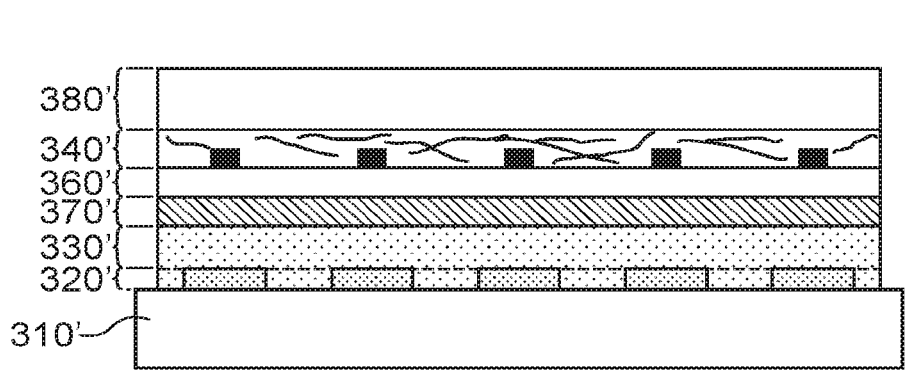
FIG. 3C illustrates an alternative of the embodiment of FIGS. 3A and 3B.

FIG. 3C illustrates an alternative 300', which only differs from the embodiment of FIGS. 3A and 3B in that the electromagnetic shielding stage extends above the heating stage.

In particular, the heat pattern sensor 300' comprises, superimposed in this order above the substrate 310':
 the stage 320' of charge collection electrodes;
 the stage 330' including a pyroelectric material;
 the heating stage 370';
 the electrical insulation layer 360';
 the electromagnetic shielding stage 340'; and
 the protective layer 380' such as described above, distinct from the electromagnetic shielding stage 340'.

According to this alternative, each heating line of the heating stage 370' also forms a reference electrode, common to all the pixels of a line of pixels of the matrix of pixels. Said heating line is able to be connected to a potential source, itself suitable for making a non-zero current circulate in the heating line. This current has to remain constant during the reading of the charges on the charge collection electrodes of the associated pixels. When the other side of the heating line is connected to the ground, said potential source advantageously alternates between two constant values: a zero value where the heating line does not heat up, and a non-zero value where the heating line provides heating by Joule effect.

In an alternative, the heating stage 370' comprises pairs of two strips parallel with each other, one dedicated to the heating of a line of pixels, and the other forming a reference electrode common to the pixels of the same line of pixels.

According to another alternative, the electromagnetic shielding stage does not comprise thermally conducting pads.

According to alternatives not represented of the embodiment of FIGS. 3A and 3B, and the embodiment of FIG. 3C, the charge collection electrodes of a same column of pixels are not connected together, and the addressing of the pixels is of active type and requires selection means in each pixel, such as transistors.

According to alternatives, not represented, of the embodiment of FIGS. 3A and 3B and the embodiment of FIG. 3C, the composite material in the electromagnetic shielding stage 340, or 340' further comprises graphene particles.

The invention is not limited to the examples described above, and numerous alternatives may be implemented without going beyond the scope of the invention.

In particular, the invention applies to any type of thermal sensor comprising a matrix of pyroelectric capacitances, with or without heating elements, with heating elements that are distinct or laid out in heating strips parallel with each other.

In the above examples, the lengthened electrically conducting structures of the shielding layer are metal nanowires. As a complement or in an alternative, they may be nanotubes, in particular carbon nanotubes.

According to an alternative of the invention, said lengthened electrically conducting structures do not extend into a binder such as a polymeric host matrix, but are entangled with each other and surrounded by a gas such as air forming the surrounding medium according to the invention. The surrounding medium then being electrically non-conducting, the lengthened electrically conducting structures then extend into a percolated network.

The invention applies more specifically to sensors in which the distance between the contact surface and the plane of the upper faces of the lower electrodes of the pyroelectric capacitances is less than or equal to the pixel pitch of the sensor.

The heat pattern sensor according to the invention may comprise heating elements which are not connected together in heating lines.

The invention is not limited either to an active type detection, and also covers sensors suitable for a passive type detection, without heating element to heat the pyroelectric material portions of the pixels of the sensor.

When the dimensions of the pixel so allow, each pixel of the matrix of pixels may comprise a plurality of pads of the electromagnetic shielding stage.

In all the embodiments, the electromagnetic shielding stage extends between the stage including a pyroelectric material and the contact surface of the sensor. Even so, intercalary stages may be situated between the electromagnetic shielding stage and the stage including a pyroelectric material, respectively between the electromagnetic shielding stage and the contact surface. In particular, a protective layer advantageously extends between the electromagnetic shielding stage and the contact surface, distinct from the electromagnetic shielding stage. Whatever the case, a protective layer forms a layer distinct from the electromagnetic shielding stage.

Preferably, the electromagnetic shielding stage is entirely constituted of the composite material shielding layer such as described above, or an assembly comprising thermally conducting pads and said shielding layer.

The sensor may include at least one reading circuit, for measuring a quantity of charges collected by a charge collection electrode, and, if need be, at least one circuit for controlling the heating, for sending electrical signals making it possible to heat the pixels of the sensor through heating elements. It may further comprise an electronic processing circuit able to construct a global image of a thermal pattern, from measurements made at the level of each of the pixels of the sensor.

The thermal pattern being able to be imaged by the sensor may be a papillary print, or any other pattern associated with an object having a heat capacity and a specific heat capacity.

A method for manufacturing the electromagnetic shielding stage may comprise the following steps:

depositing, directly on the stage comprising a pyroelectric material or on a layer above the stage comprising a pyroelectric material, an ink comprising, in suspension in a solvent, metal nanowires, particles of the material of the binder, and if need be graphene particles; then evacuating the solvent, to form the composite material shielding layer.

In this case, the composition of the composite material, given above using percentages by weight, corresponds to the composition of the ink after evacuation of the solvent.

In an alternative, the ink only comprises metal nanowires, in suspension in a solvent. After evacuation of the solvent, there only remains the metal nanowires.

If need be, spaces between the metal nanowires are filled later by the material of a layer next deposited above the metal nanowires, for example the material of an electrical insulation layer. In an alternative, the material of a layer next deposited above the metal nanowires does not manage to insert itself between the nanowires, such that the nanowires remain surrounded by a gas such as air.

The solvent is chosen so as not to dissolve the layer on which the ink is deposited, for example so as not to dissolve a layer comprising a pyroelectric material.

It is for example a solvent that does not dissolve PVDF and which dissolves polystyrene (binder), such as butyl-acetate, propyl-acetate, or PGMEA (propylene glycol methyl ether acetate).

In an alternative, it may be a solvent that does not dissolve PVDF and which dissolves PMMA (binder), such as 2-methoxyethanol, butyl-acetate, ethoxyethanol, ethyl acetate, propyl acetate, or PGMEA.

In an alternative, it may be a solvent that does not dissolve PVDF and that dissolves PEDOT:PSS or PAni (binder), such as water.

The ink is deposited so as to extend in one piece and without opening above the substrate.

The ink is deposited by a printing technique such as screen printing, or ink jet printing, rotogravure, flexogravure, offset gravure, etc.

If need be, pads made of thermally conducting material are formed above the stage comprising a pyroelectric material, before said ink deposition step. The pads may also be produced by depositing an ink.

In an alternative, the ink comprises nanotubes, notably carbon nanotubes, as a complement or in the place of the metal nanowires.

The invention claimed is:

1. A heat pattern sensor comprising a matrix of pixels, each pixel comprising at least one pyroelectric capacitance which is formed by a pyroelectric material portion arranged between a charge collection electrode and a reference electrode, and the matrix of pixels comprising, superimposed above a substrate:
   a stage of charge collection electrodes, comprising the charge collection electrodes of each of the pixels; and
   a stage including a pyroelectric material, comprising the pyroelectric material portions of each of the pixels;
   the matrix of pixels further comprising an electromagnetic shielding stage, electrically conducting, situated between the stage including the pyroelectric material and a contact surface to apply thereto an object to image;
   wherein the electromagnetic shielding stage includes a shielding layer which comprises nanowires and/or nanotubes lying in a surrounding medium, said nanowires and/or nanotubes each being constituted of a material having a thermal conductivity greater than that of said surrounding medium, and wherein a ratio between a distribution pitch of the pixels of the matrix of pixels and a thickness of the shielding layer is greater than or equal to 20.

2. The heat pattern sensor according to claim 1, wherein the material of the nanowires and/or nanotubes has a thermal conductivity at least ten times greater than that of said surrounding medium.

3. The heat pattern sensor according to claim 1, wherein the shielding layer is constituted of a composite material, the composite material comprising said nanowires and/or nanotubes integrated in a binder which forms said surrounding medium.

4. The heat pattern sensor according to claim 3, wherein the composite material comprises between 20% and 40% by weight of nanowires and/or nanotubes.

5. The heat pattern sensor according to claim 3, wherein the binder is an electrically insulating polymer matrix, and wherein the nanowires and/or nanotubes together form a percolated network.

6. The heat pattern sensor according to claim 3, wherein the binder is an electrically conducting polymer matrix, and wherein the nanowires and/or nanotubes together form a non-percolated network.

7. The heat pattern sensor according to claim 3, wherein the composite material further comprises graphene particles.

8. The heat pattern sensor according to claim 7, wherein the composite material further comprises between 10% and 30% by weight of graphene particles.

9. The heat pattern sensor according to claim 1, wherein the nanowires and/or nanotubes each have a length strictly less than the distribution pitch of the matrix of pixels.

10. The heat pattern sensor according to claim 1, wherein the electromagnetic shielding stage further includes pads comprising graphene or metal.

11. The heat pattern sensor according to claim 1, wherein:
   each pixel further comprises a heating element, able to heat by Joule effect the pyroelectric material portion of said pixel; and
   a heating stage, comprising the heating elements of each of the pixels, extends into the matrix of pixels between the stage including the pyroelectric material and the contact surface.

12. The heat pattern sensor according to claim 11, wherein:
   the heating elements of a same line of pixels are formed together in one piece, in a same heating strip;
   the charge collection electrodes of a same column of pixels are formed together in one piece, in a same charge collection macro-electrode; and
   the electromagnetic shielding stage further includes a matrix of pads comprising graphene or metal, each pad extending through an intersection region between a projection of a heating strip and a projection of a charge collection macro-electrode, said projections being orthogonal projections in a plane parallel to an upper or lower face of the substrate.

13. The heat pattern sensor according to claim 11, wherein the matrix of pixels comprises, superimposed:
   the stage of charge collection electrodes;
   the stage including the pyroelectric material;
   the electromagnetic shielding stage, further forming the reference electrodes of the pixels of the matrix of pixels;
   an electrical insulation layer; and
   the heating stage.

14. The heat pattern sensor according to claim 11, wherein the matrix of pixels comprises, superimposed:
   the stage of charge collection electrodes;
   the stage including the pyroelectric material;
   the heating stage, the heating elements of each of the pixels further forming the reference electrodes of the pixels of the matrix of pixels;
   an electrical insulation layer; and
   the electromagnetic shielding stage.

15. A method for manufacturing the matrix of pixels of the heat pattern sensor according to claim 1, wherein a step of producing the electromagnetic shielding stage comprises deposition of an ink including, in suspension in a solvent, said nanowires and/or nanotubes.

* * * * *